United States Patent [19]

Oettle et al.

[11] 4,302,972

[45] Dec. 1, 1981

[54] APPARATUS FOR MEASURING TEMPERATURE AND A METHOD OF PRODUCING SAME

[75] Inventors: George W. Oettle, Woodbridge, N.J.; Bo H. Håkansson, Lund, Sweden

[73] Assignee: Crafon Medical AB, Sweden

[21] Appl. No.: 44,387

[22] Filed: Jun. 1, 1979

[30] Foreign Application Priority Data

Jan. 25, 1979 [SE] Sweden ................................. 7900673

[51] Int. Cl.³ .............................................. G01K 7/22
[52] U.S. Cl. ........................... 73/362 AR; 73/362 SC; 338/22 R
[58] Field of Search .................. 338/22 SD, 22 R, 23, 338/25, 8; 73/362 SC, 362 AR, 359; 29/612

[56] References Cited

U.S. PATENT DOCUMENTS

| | | | |
|---|---|---|---|
| 3,028,756 | 4/1962 | Takagishi et al. | 73/362 AR |
| 3,109,227 | 11/1963 | Goodyear | 338/8 |
| 3,110,088 | 11/1963 | Blom | 29/612 |
| 3,673,538 | 6/1972 | Faxon | 338/25 |
| 3,684,996 | 8/1972 | Schwarz | 338/22 |
| 3,750,471 | 8/1973 | Bremer | 73/362 AR |
| 3,889,362 | 6/1975 | Tyler | 29/612 |

FOREIGN PATENT DOCUMENTS

2105486  4/1972  France .................................... 338/8

*Primary Examiner*—Donald O. Woodiel
*Attorney, Agent, or Firm*—Lerner, David, Littenberg & Samuel

[57] ABSTRACT

Temperature-sensitive instruments and methods for producing them are disclosed. The apparatus disclosed comprises a pair of temperature-sensitive sensors which have at least one electrical property, such as resistance, which varies with temperature, and which are in electrical communication with each other, conductors connected to these sensors so that the temperature-sensitive instrument can be employed to provide a temperature reading by determining that electrical property from the conductors, and where the electrical property of each of the sensors has equal and opposite deviations from predetermined values so that the sum of those deviations approximately equals zero. In a preferred embodiment the sensors are coupled in series.

The method disclosed includes measuring an electrical property of a plurality of these temperature-sensitive sensors, which preferably are thermistors, sorting the sensors in accordance with the measured values of that electrical property, selecting a plurality of the sorted sensors so that the sum of the deviations from predetermined values of the measured values of their respective electrical properties is approximately equal to zero, and assembling those selected sensors into a temperature-sensitive instrument.

12 Claims, 6 Drawing Figures

APPARATUS FOR MEASURING TEMPERATURE AND A METHOD OF PRODUCING SAME

TECHNICAL FIELD

The present invention relates to an apparatus for measuring temperature, comprising a temperature-sensitive sensor whose electric properties, for example, resistance, vary with the temperature, for example, a thermistor which is connected to two electric lines which, in turn, may be connected to a read-off unit for reading off the values of current, voltage or the like corresponding to the temperature.

The apparatus according to the invention is primarily intended for use in medicinal temperature measurement. One aspect of the invention is, therefore, to make it so simple and economical that it may be disposed of after use, that is to say that it need not be reused.

At the same time however, it should be possible to manufacture the apparatus with such precision that the reader may rely with certainty on the read-off values, this being of the greatest importance in medicinal use.

However, it is clear to a person skilled in the art that the apparatus according to the invention may also be used in other applications, for example, in pure industrial application, where a simple and economical but nevertheless reliable reading-off of temperature is desired.

BACKGROUND ART

Swedish Patent Application 78.03046-7 (U.S. Ser. No. 779,152) and two copending Applications PCT/SE78/00012 and PCT/SE78/00013 describe different embodiments of an apparatus similar to that according to the invention and how the apparatus according to the invention may be used. The concept forming the basis of the present invention is, in this instance, int. al to realize such an apparatus but of simpler type and adapted to a simpler manner of manufacture.

In U.S. Pat. 4,200,970 and U.S. application Ser. No. 879,193, filed Feb. 21, 1978, there are described different trimming processes for apparatuses similar to that according to the invention.

The primary object of the present invention is to replace these relatively complicated trimming processes with a simple sorting process and subsequent combination of two or more sensors.

DESCRIPTION OF THE INVENTION

The apparatus according to the invention is characterized by one or more further sensors which, together with the first-mentioned sensor, are selected and coupled such that they, at least within a determined temperature range, have a value of the above-mentioned electric property accurately corresponding to the temperature.

Preferably, the sensors are connected in series between the two electric lines and are selected such that the sum of their deviations from certain determined values have a predetermined value, for example zero.

Thus, the invention also relates to a method of producing the above-described apparatus. This method is characterized in that the above-mentioned electric property for a large number of sensors is measured, the property forming the basis of a sorting within carefully determined intervals, whereafter two or more sensors are selected for each apparatus. The selected sensors, on the desired coupling to the electric lines, giving a desired value of the above-mentioned electric property.

SORTING OF SENSORS

The above-mentioned sensors are suitably constituted of two thermistors, fixedly disposed on a copper foil which will be described in greater detail in the following discussion under the title "Preferred embodiment of the invention".

Sorting of these thermistors is, in this case, suitably effected in a temperature chamber whose temperature is stabilized at, for example, 38° C±0.5° C. or, if possible, better.

Measurement of the resistance of the sample may be effected with a current of 300 $\mu$A, which gives a power consumption in the component or approximately 270 $\mu$W, which is so low that the temperature is not appreciably elevated.

The same current runs through a reference thermistor which will then be heated just as much. This is placed adjacent the point where the sample is measured. The difference between the two thermistors will then decide in which box the sample is placed.

For example, it is possible to sort thermistors with resistance of 3000Ω in compartments whose width is 0.5% (15Ω). These thermistors are then paired together in series coupling so that their respective resistances are added. A resistance of 6000Ω can, for example, be obtained by two resistances of 3105 and 2895 or by two resistances of precisely 3000Ω.

Through this process, substantially all thermistors can be utilized, that is to say with an effective level of 100%.

If a trimming process is utilized instead, it will be difficult to attain above 80% and, moreover, the result will be a component which is mechanically much weaker.

Mounting may then be effected in that one thermistor from each respective batch is placed, by means of two vacuum pincettes, on a small copper foil piece and are fixedly welded thereto. The two thermistors may then be considered as a sensor, as is also the case in the following description, in the same manner as the description in co-filed U.S. Patent application Ser. No. 196,079, filed Sept. 25, 1980.

Alternatively, the thermistors may be coupled in parallel, utilizing the formula $1/R = (1/R_1) + (1/R_2)$. If, in this situation, a resistance of 6000Ω is desired, this may be attained by a parallel coupling of, for example, one resistance of 12,100.0Ω and one of 11901.6Ω.

The advantage inherent in measuring against a reference thermistor which may be placed directly adjacent the thermistor under examination is that it is not necessary to maintain the temperature at the measurement side within ±0.05°, which would otherwise have been necessary in order to achieve an accuracy sufficient for medical temperature measurement.

BRIEF DESCRIPTION OF THE DRAWINGS

Finally.

PREFERRED EMBODIMENT OF THE INVENTION

Figure 1:
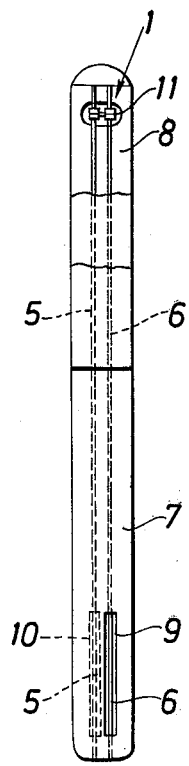
FIG. 1 shows a preferred embodiment of the apparatus according to the invention, certain parts of the different material layers having been removed.
Figure 2:
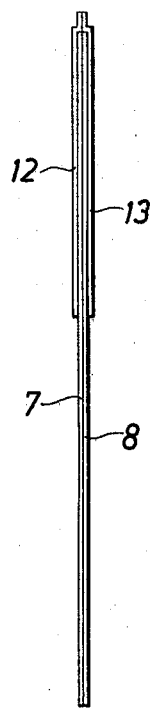
FIG. 2 is a side elevation of the same apparatus.
Figure 3:
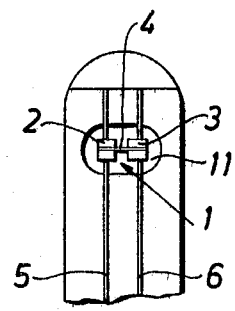
FIG. 3 is an enlargement of the forward end of the apparatus.
Figure 4:
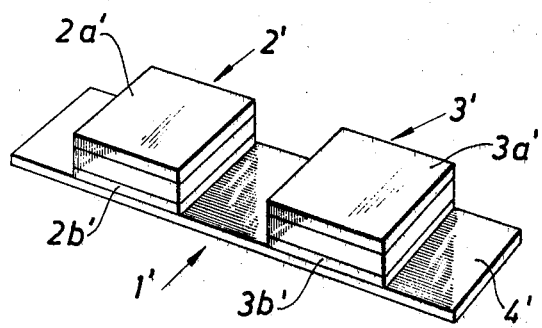
FIG. 4 shows an alternative embodiment of the sensor which is utilized in the apparatus according to FIGS. 1-3.

The apparatus shown by way of example comprises, thus, a temperature-sensitive sensor which in its entirety is designated 1 in FIGS. 1 and 3' and 2', respectively, in FIG. 4. Thus, this sensor consists according to FIGS. 1-3 of two thermistors 2 and 3 which are interconnected via an intermediate line 4. Each one of these thermistors constitutes, thus, a sensor in the sense that this word is used in the claims, at the same time as they form, in their entirety, one sensor, as will be apparent from the following discussion.

In FIG. 4, the thermistors are, instead, designated 2' and 3', respectively, whereas the intermediate line consists of a copper foil designated 4'. In this case, the terminals of the one thermistor are designated $2a'$ and $2b'$, whereas the terminals of the second thermistor are designated $3a'$ and $3b'$.

Furthermore, the two thermistors 2 and 3 are connected to electric lines 5 and 6, respectively. In the embodiment according to FIG. 4, the corresponding lines are connected to the terminals $2a'$ and $3a'$.

The electric lines 5 and 6 are encapsulated between two inner, insulating layers 7 and 8 which present mutually offset holes 9 and 10, respectively, each in register with their respective line 6 and 5, respectively. As a result, these lines 6 and 5 are disposed through the holes 9 and 10.

The two insulating layers 7 and 8 suitably consist of plastics-coated paper, which facilitates manufacture, since heat sealing may be used to unite the two layers with each other and with other materials. At the same time, use is made possible of the apparatus according to the invention in a humid environment.

The two insulating layers 7 and 8 present, furthermore, holes 11 in register with each other and with the sensor.

The sensor 1 and the holes 11 in register therewith are covered by two insulating, outer layers 12 and 13. These outer layers are provided only along the forward end of the apparatus and do not, thus, cover the holes 9 and 10.

As is most clearly apparent from FIG. 1, the two electric lines 5 and 6 are of substantially the same length as the two elongate insulating layers 7 and 8, between which they are located, the sensor 1 being located proximal to one end which, as above and as in the following discussion, is designated the forward end of the apparatus, whereas the mutually offset holes 9 and 10 are located proximal the opposite end of the insulating layers.

The two insulating, outer layers 12 and 13 extend out over the forward end of the two inner, insulating layers such that they also insulate the ends of the lines 5 and 6 located therebetween. As a result, this forward end may be rounded-off without exposing these lines.

PREFERRED MANNER OF MANUFACTURE

First, a composed sensor is produced consisting of two thermistors by means of sorting and combining as described above under the title "Sorting of sensors".

Figure 5:
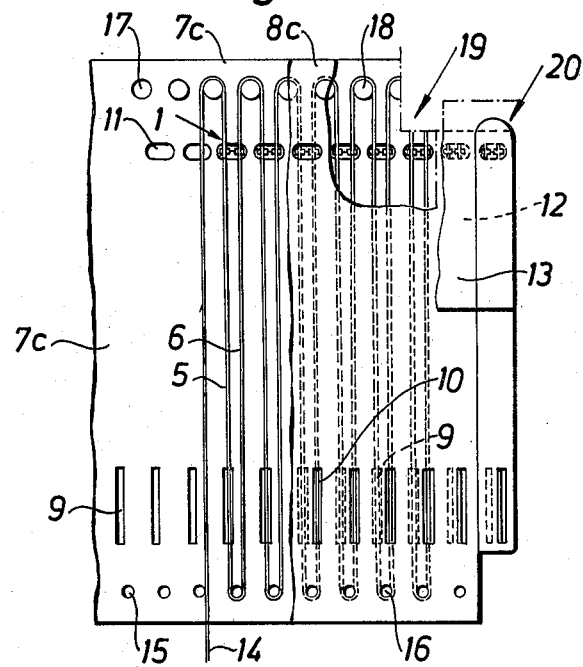
FIG. 5 is intended to illustrate a simple method of producing the apparatus shown in FIGS. 1-3.
Figure 6:
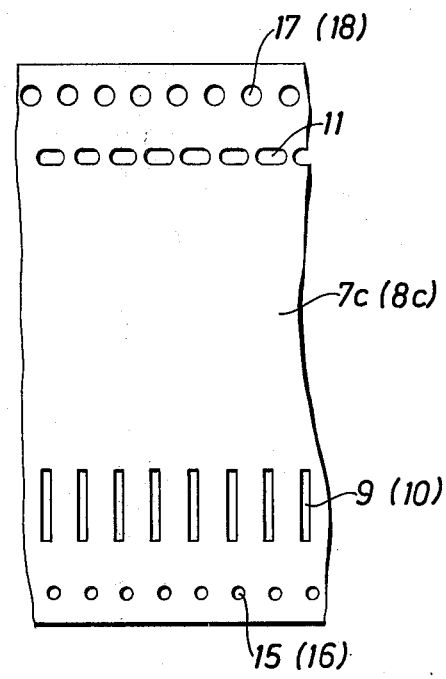
FIG. 6 shows one of the material layers used in the manufacture according to FIG. 5.

Thereafter, the apparatus according to the invention is suitably produced in the manner which is more closely illustrated in FIGS. 5 and 6. One line 14, for example, a thin copper wire, is led in zig-zag formation between two paper webs 7c and 8c. These webs are synchronously driven through pins or sprockets entering punched holes 15, 16, 17 and 18. Both of the webs are provided with holes 11 which, as a result of the synchronous advancement, will be located in register with each other. In register with the holes 11, the lines 5 and 6 formed by so that the wire 14 are also exposed, the sensor 1 may be connected thereto. Therafter, the two outer edge portions of the webs 7c and 8c with the holes 15, 16, 17 and 18 may be cut off. This is intimated at the arrow 19. Thereafter, the outer layers 12 and 13 are applied, which also suitably is effected in the form of two webs. For the sake of simplicity however, complete webs are not shown in FIG. 5. Finally, the forward end of the apparatus is rounded-off by punching, which may suitably be effected in conjunction with the apparatus in its entirety being punched out from the produced material web.

In FIG. 5 the manufacturing process is illustrated, naturally, schematically and in a highly concentrated state. In practice, the different manufacturing operations are effected by means of separate apparatuses in completely separate processes, for example, in separate stations along a longer material web which is constructed gradually.

Finally, FIG. 6 shows a material web which may constitute either of the material webs 7c and 8c which differ from each other only by the placing of the holes 9 and 10, respectively. Thus, the holes 17 and 18, and 15 and 16, respectively, are identical, at the same time as both webs contain holes 11.

The invention is, naturally, not restricted only to the above-described embodiments, but may be varied within the spirit and scope of the appended claims. For example, the plastics-coated paper layers 7 and 8 may be replaced by layers of waxed paper with, for example, a hotmelt coating on one side for the joining-together process. Alternatively, they may be replaced by normal paper without moisture insulation, since this may be realized by means of the outer layers 12 and 13. In this instance, the sealing may be produced by means of a hotmelt, adhesive or other suitable binder.

We claim:

1. Apparatus for measuring temperature within a predetermined range for medical applications and the like comprising:

first and second temperature measuring sensors, each of said sensors exhibiting at least one corresponding measurable electrical characteristic which varies as a function of temperature, each of said sensors having a measured value for said electrical characteristic at a selected temperature within said predetermined range and said measured value for said electrical characteristic for each sensor at said selected temperature corresponding to a determined value and a selected deviation from said determined value so that the composite value of said selected deviations at a single selected temperature is such that said selective deviations substantially cancel each other out;

means for electrically interconnecting said first and second sensor means; and conductor means connected to said first and second temperature measuring sensors for providing an output corresponding to the resultant value of said corresponding, measurable electrical characteristics of said interconnected first and second temperature measuring sensors, said measured value of said electrical characteristic at said selected temperature for aid first and second temperature measuring sensors yielding a resultant value for said electrical characteristics of said first and second temperature measuring sensors at said selected temperature and throughout said predetermined range which corresponds to a resultant value obtained by interconnection of first and second temperature measuring sensors having electrical characteristics substantially equal to said determined value at said selected temperature and varying in accordance therewith throughout said predetermined range.

2. The apparatus according to claim 1 wherein said sensors are connected in series to said conductor means.

3. The apparatus according to claim 1 wherein said sensors are connected in parallel to said conductor means.

4. The apparatus according to claim 1 wherein said first and second temperature measuring sensors take the form of first and second individual thermistor bodies, respectively.

5. The apparatus according to claim 1 wherein said conductor means comprises first and second conductors.

6. The apparatus according to claim 1 wherein said electrical characteristic comprises resistance.

7. The apparatus according to claim 1 wherein said selected temperature is approximately 38° C.

8. A method of making a device for measuring temperature within a predetermined range, said device employing at least first and second temperature measuring sensors, each of said temperature measuring sensors exhibiting a measurable electrical characteristic which varies as a function of temperature, said method comprising the steps of:

measuring said electrical characteristic of a plurality of temperature measuring sensors at a single selected temperature within said predetermined range, said measured value for said electrical characteristics for each sensor at said selected temperature within said predetermined range corresponding to a determined value and a deviation from said determined value;

sorting said plurality of temperature measuring sensors into a plurality of finite batches of said temperature measuring sensors on the basis of the magnitude and direction of said deviation of each sensor from said determined value;

randomly selected first and second temperature measuring sensors from a predetermined pair of said plurality of said batches of said sorted temperature measuring sensors for interconnection in said device, said first and second temperature measuring sensors being selected to yield when interconnected in said device a resulting value for said electrical characteristics exhibited thereby at said selected temperature and throughout said predetermined range corresponding to a resulting value obtained by an interconnection of first and second temperature measuring sensors having electrical characteristics equal to said determined value at said selected temperature and varying in accordance therewith throughout said predetermined range; and interconnecting said selected first and second temperature measuring sensors in said device to measure temperature.

9. The method according to claim 8 wherein said sensors take the form of thermistors, and further including the step of connecting said thermistors in series.

10. The method in accordance with claim 8 wherein said sensors take the form of thermistors, and further including the step of connecting said thermistors in parallel.

11. The method in accordance with claim 8 wherein said measuring step is performed by comparing the sensor being measured with a reference sensor.

12. The method in accordance with claim 8 wherein said electrical characteristic comprises resistance.

* * * * *